US012584763B2

(12) United States Patent
Imaoka

(10) Patent No.: US 12,584,763 B2
(45) Date of Patent: Mar. 24, 2026

(54) ENVIRONMENT MAP GENERATION PROGRAM AND THREE-DIMENSIONAL SENSOR CONTROL DEVICE

(71) Applicant: NACHI-FUJIKOSHI CORP., Tokyo (JP)

(72) Inventor: Makoto Imaoka, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 19/027,732

(22) Filed: Jan. 17, 2025

(65) Prior Publication Data

US 2025/0246006 A1     Jul. 31, 2025

(30) Foreign Application Priority Data

Jan. 30, 2024     (JP) ................................. 2024-011626

(51) Int. Cl.
G01C 21/00          (2006.01)
G01S 7/48          (2006.01)
(Continued)

(52) U.S. Cl.
CPC ..... G01C 21/3804 (2020.08); G01C 21/3841 (2020.08); G01S 7/4808 (2013.01); (Continued)

(58) Field of Classification Search
None
See application file for complete search history.

(56) References Cited

U.S. PATENT DOCUMENTS

2022/0283310 A1     9/2022 Lee et al.
2023/0134717 A1     5/2023 Xu
(Continued)

FOREIGN PATENT DOCUMENTS

CN          105867373 A     8/2016
DE     10 2022 204 515 A1     11/2023
(Continued)

OTHER PUBLICATIONS

Extended European Search Report issued in European Application No. 25152291.8, dated Jun. 24, 2025 (8 pages).
(Continued)

*Primary Examiner* — Mohammed Jebari
(74) *Attorney, Agent, or Firm* — Crowell & Moring LLP

(57)          ABSTRACT
A three-dimensional sensor control device performs processes of acquiring orthogonal coordinates of data points found in a plurality of photograph frames photographed by at least one three-dimensional sensor with a fixed photographing range and converting the orthogonal coordinates of the data points into polar coordinates using a first formula for conversion from orthogonal coordinates to polar coordinates The device then performs searching each sub-region of the photographing range to locate a set of polar coordinates representing a farthest data point that is located farthest in distance from the three-dimensional sensor in a respective sub-region and converting the polar coordinates of a collection of the farthest data points back into orthogonal coordinates using a second formula for conversion from the polar coordinates to the orthogonal coordinates, The device outputs environment map data of the photographing range using the orthogonal coordinates of the collection of the farthest data points.

4 Claims, 6 Drawing Sheets

(51) Int. Cl.

| | | |
|---|---|---|
| *G01S 17/89* | (2020.01) | |
| *G01S 17/931* | (2020.01) | |
| *G06T 7/73* | (2017.01) | |
| *G06T 17/05* | (2011.01) | |
| *G06V 20/64* | (2022.01) | |

(52) U.S. Cl.

CPC ............ *G01S 17/89* (2013.01); *G01S 17/931* (2020.01); *G06T 7/73* (2017.01); *G06T 17/05* (2013.01); *G06V 20/64* (2022.01)

(56) References Cited

U.S. PATENT DOCUMENTS

| | | | |
|---|---|---|---|
| 2023/0296742 A1* | 9/2023 | Yu ........................... | G01S 7/497 |
| | | | 356/3 |
| 2024/0037804 A1* | 2/2024 | Ramasubramonian ...................... | |
| | | | G06T 9/001 |
| 2024/0103174 A1* | 3/2024 | Gu ........................ | G01S 7/4817 |
| 2025/0224732 A1* | 7/2025 | Juette .................... | G05D 1/622 |

FOREIGN PATENT DOCUMENTS

| | | |
|---|---|---|
| JP | 2022-134119 | 9/2022 |
| KR | 10-2021-0022016 A | 3/2021 |

OTHER PUBLICATIONS

Zhang, Z., et al.; "Automatic Background Construction and Object Detection Based on Roadside LiDAR", IEEE Transactions on Intelligent Transportation Systems, Oct. 2020, pp. 4086-4097, vol. 21, No. 10 (12 pages).

* cited by examiner

Three-dimensional
Sensor Control Device 1

11

CPU

12

Memory

15 Bus

13

Auxiliary
Storage

14

Input/Output
Interface

Three-
dimensional
sensor

2

Three-dimensional Sensor Control Device 1
(Environment Map Generation Program 10)

FIG. 4

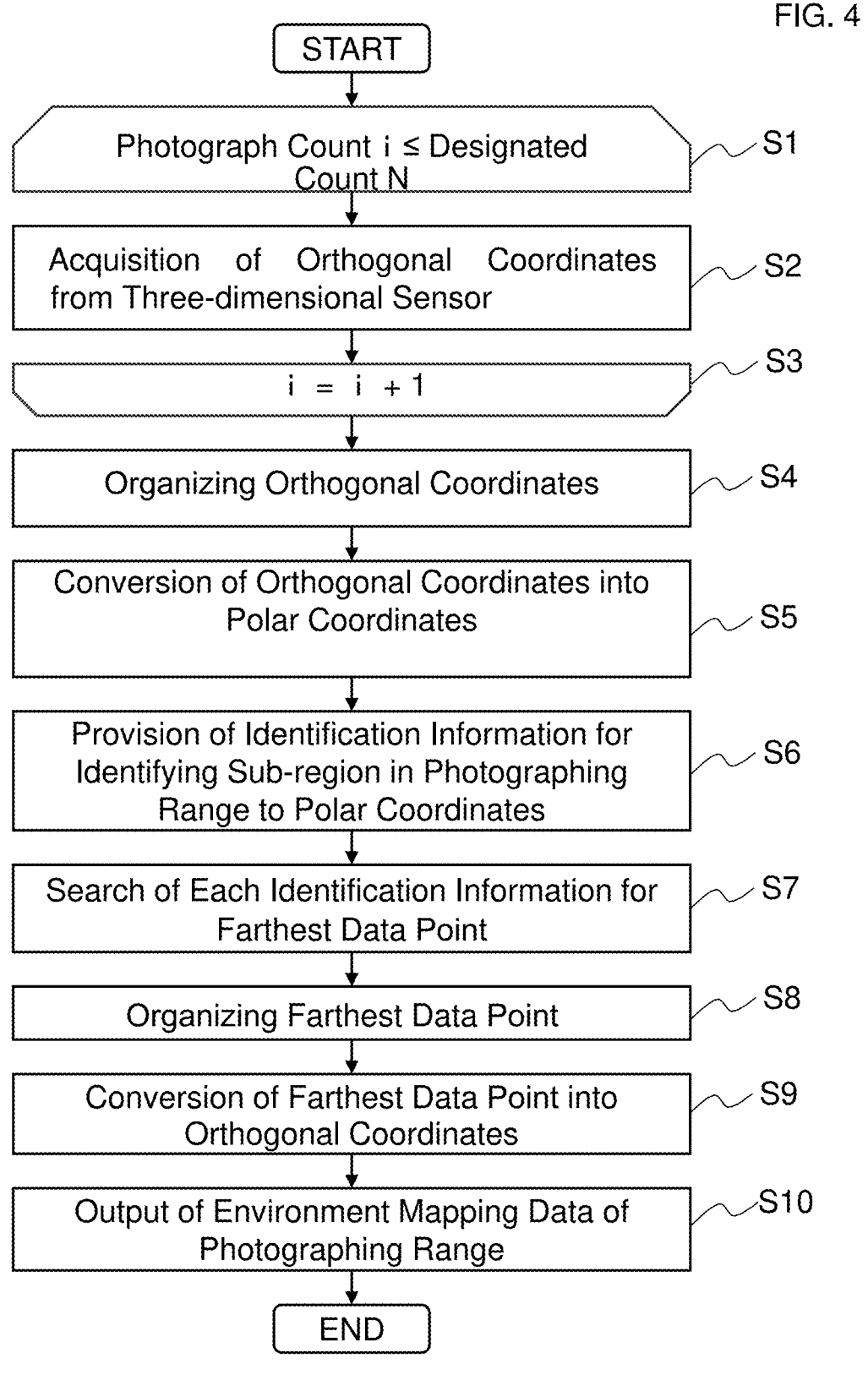

START

Photograph Count i ≤ Designated Count N ~ S1

Acquisition of Orthogonal Coordinates from Three-dimensional Sensor ~ S2 i = i + 1 ~ S3

Organizing Orthogonal Coordinates ~ S4

Conversion of Orthogonal Coordinates into Polar Coordinates ~ S5

Provision of Identification Information for Identifying Sub-region in Photographing Range to Polar Coordinates ~ S6

Search of Each Identification Information for Farthest Data Point ~ S7

Organizing Farthest Data Point ~ S8

Conversion of Farthest Data Point into Orthogonal Coordinates ~ S9

Output of Environment Mapping Data of Photographing Range ~ S10

END

ENVIRONMENT MAP GENERATION PROGRAM AND THREE-DIMENSIONAL SENSOR CONTROL DEVICE

RELATED APPLICATIONS

This application claims priority to Japanese Patent Application No. JP2024-011626, filed on Jan. 30, 2024, the entire content of which is incorporated herein by reference.

BACKGROUND OF THE INVENTION

1. Field of the Invention

The present invention relates to an environment map generation program for generating an environment map.

2. Description of the Related Art

Implementation of technologies such as automated vehicle operations, autonomous mobile robots (AGV: automatic guided vehicles), collaborative robots, meal serving robots, robot cleaners, drone controls, and augmented reality (AR) devices requires preparation of environment maps of surroundings. A technique called "simultaneous localization and mapping (SLAM)" has been conventionally used for environment mapping. The SLAM can carry out self-localization and environment mapping under limited conditions. For example, Japanese Unexamined Patent Application Publication No. 2022-134119 describes collecting space related data by means of LiDAR SLAM, which uses a light detection and ranging (LiDAR) sensor. In general, a three-dimensional sensor such as the LiDAR sensor acquires a cloud of data points that can be represented in three-dimensional coordinates (x, y, z).

SUMMARY OF THE INVENTION

The conventional SLAM has three issues. Firstly, since the cloud of data points is less dense than the resolution of ordinary still images, matching between clouds of data points (i.e., point-cloud matching) may not be performed sufficiently. For example, in an environment such as a plain field that lacks structural objects, point-cloud matching cannot be performed sufficiently and thus environment maps cannot be generated accurately. Secondly, since the point-cloud matching requires a high processing load, a high-spec computer is required for the matching process or ingenuity is required to speed up the process. Thirdly, since the SLAM assumes that the environment is static, when used to develop a map of an environment where a moving object such as a human is present, the SLAM recognizes the moving object as a landmark and generate an incorrect environment map.

The present invention has been made in view of the above problems. It is an object of the present invention to provide an environment map generation program and a three-dimensional sensor control device that can generate an environment map accurately and speedily even in an environment in which a moving object is present.

To achieve the above object, an embodiment of the present invention provides a non-transitory computer-readable storage medium storing a computer program for causing at least one processor to implement acquiring orthogonal coordinates of data points found in a plurality of photograph frames photographed by at least one three-dimensional sensor with a fixed photographing range. The at least one processor further implements converting the orthogonal coordinates of the data points into polar coordinates using a first formula for conversion from orthogonal coordinates to polar coordinates. The at least one processor further implements searching each sub-region of the photographing range to locate a set of polar coordinates representing a farthest data point that is located farthest in distance from the three-dimensional sensor in a respective sub-region. The at least one processor then implements converting the polar coordinates of a collection of the farthest data points back into orthogonal coordinates using a second formula for conversion from the polar coordinates to the orthogonal coordinates, and outputting environment map data of the photographing range developed based on the orthogonal coordinates of the collection of the farthest data points.

Another embodiment of the present invention provides a three-dimensional sensor control device including at least one memory that stores a computer program and at least one processor that executes the computer program. The at least one processor executes the computer program to implement acquiring orthogonal coordinates of data points found in a plurality of photograph frames photographed by at least one three-dimensional sensor with a fixed photographing range. The at least one processor further implements converting the orthogonal coordinates of the data points into polar coordinates using a first formula for conversion from orthogonal coordinates to polar coordinates. The at least one processor then implements searching each sub-region of the photographing range to locate a set of polar coordinates representing a farthest data point that is located farthest in distance from the three-dimensional sensor in a respective sub-region. The at least one processor then implements converting the polar coordinates of a collection of the farthest data points into orthogonal coordinates using a second formula for conversion from the polar coordinates to the orthogonal coordinates, and outputting environment map data of the photographing range developed based on the orthogonal coordinates of the collection of the farthest data points.

The present invention can provide an environment map generation program and a three-dimensional sensor control device that can generate an environment map accurately and speedily even in an environment in which a moving object is present.

BRIEF DESCRIPTION OF THE DRAWINGS

FIG. 4 is a flow chart showing an example of a flow of environment map generation process realized by the environment map generation program in FIG. 2.

DETAILED DESCRIPTION OF THE PREFERRED EMBODIMENTS

Figure 1:
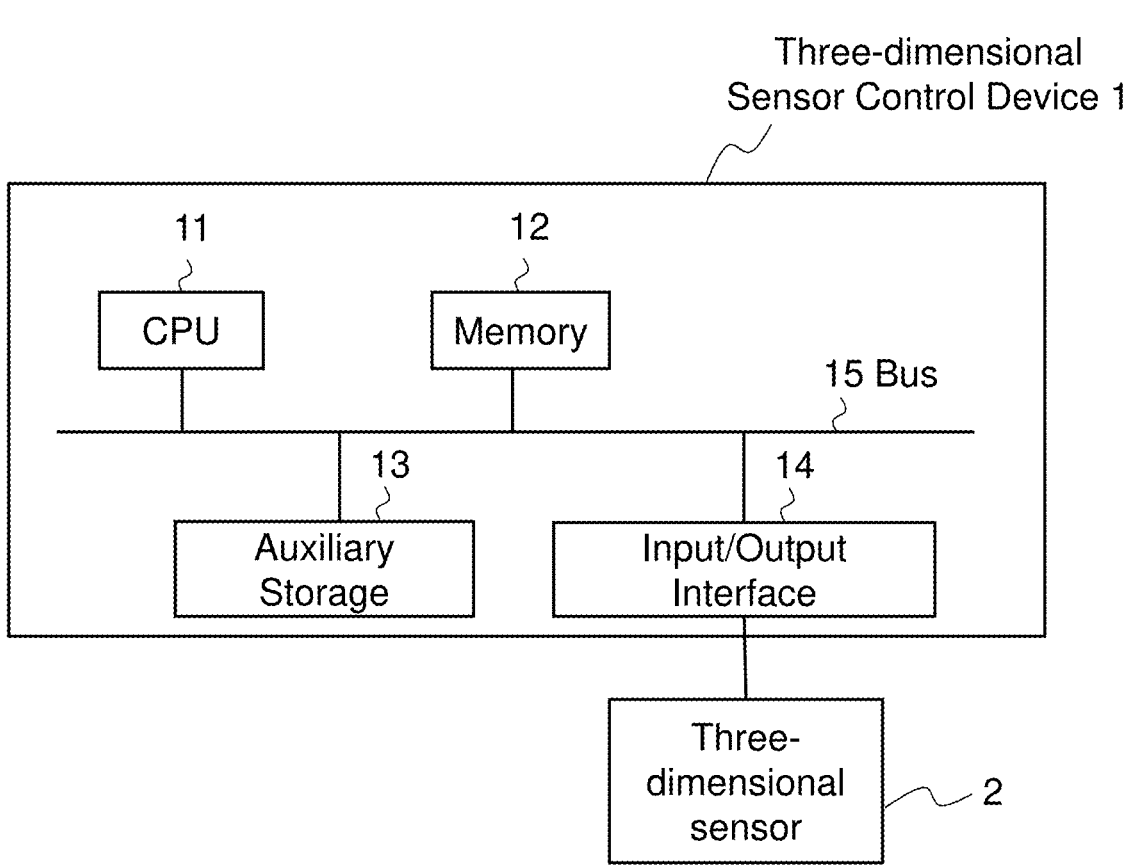
FIG. 1 is a block diagram showing an example of a computer hardware forming a three-dimensional sensor control device of the present invention.

Hereinafter, embodiments of the present invention will be described with reference to the accompanying drawings. FIG. 1 is a block diagram showing an example of a computer hardware configured to realize a three-dimensional sensor control device of the present invention. A three-dimensional sensor control device 1 comprises a computer that controls operations of a three-dimensional sensor 2 (controls acquisition of depth information of the three-dimensional sensor), and the computer includes hardware such as a central processing unit (CPU) 11, a memory 12, an auxiliary storage 13, and an input/output interface 14 that are connected with each other via a bus 15.

The CPU 11 performs processes, which will be described below, by reading out programs stored in the auxiliary storage 13 or the like, deploying the programs in the memory 12, and executing the program. The auxiliary storage 13 comprises a hard disk drive, a solid state drive, or the like, and stores data that is used in the processes discussed below. The input/output interface 14 receives input signals from the three-dimensional sensor 2, a mouse, a keyboard, a microphone, or the like, and outputs signals to the three-dimensional sensor 2, a display, a speaker, or the like. The input/output interface 14 also includes a communication interface or the like that performs transmission and reception of data with external computers. non-limiting examples of the input/output interface 14 include a port, either wired or wireless, which implements the universal serial bus (USB) specification, the HDMI (registered trademark) specification, the local area network (LAN) specification, or the like, and a communication device that implements the Bluetooth (registered trademark) specification and the wireless LAN specification.

The computer that forms the three-dimensional sensor control device 1 may be a general purpose personal computer (PC) or may be a device into which specialized hardware is installed. Also, a part or all of functions of the three-dimensional sensor control device 1, which will be described below, may be realized by specialized integrated circuits built for specific use, such as a hardware circuit, an application specific integrated circuit (ASIC), and a field programmable gate array (FPGA). Also, the number of the computers that execute the program is not limited to a specific number in the present embodiment. For example, the three-dimensional sensor control device 1 may perform processes in cooperation with external computers.

The three-dimensional sensor 2 is configured with a sensor that can measure three-dimensional positions of an object and acquires a cloud of data points, which represent a set of detected points on a surface of the object. Non-limiting examples of the three-dimensional sensor 2 include an active stereo camera, a passive stereo camera, a three-dimensional light detection and ranging (LiDAR) sensor, and a time of flight (ToF) camera. The cloud of data points acquired by the three-dimensional sensor 2 are represented by three-dimensional orthogonal coordinates (x, y, z). A possible range of each of the coordinates of the three-dimensional coordinates (x, y, z) depends on an angle range of view or a distance range of detection by the three-dimensional sensor 2. Non-limiting examples of file formats of the cloud of data points include Point Cloud Data (PCD) developed by Point Cloud Library (PCL), which is an open source library.

Figure 2:
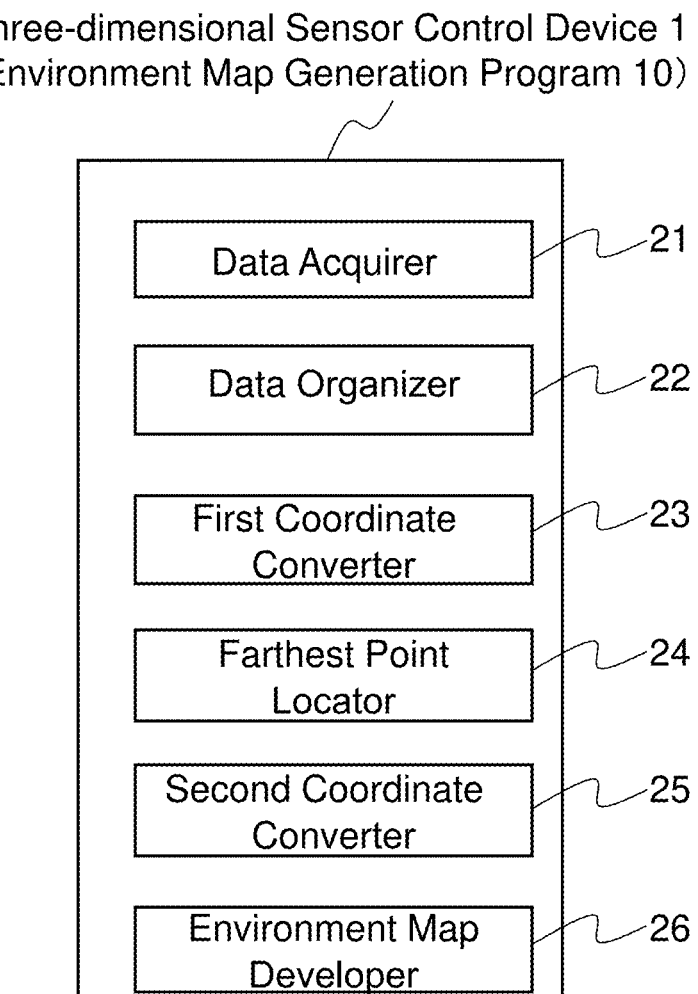
FIG. 2 is a functional block diagram showing functions of the three-dimensional sensor control device in FIG. 1.

FIG. 2 is a functional block diagram showing functions of the three-dimensional sensor control device of FIG. 1. The functions of the three-dimensional sensor control device 1 shown in FIG. 2 are realized by executing an environment map generation program 10 of the present invention. The environment map generation program 10 may be deployed in a storage medium that is readable by the computer or may be downloaded from a network such as the Internet.

The environment map generation program 10 includes a program that causes the computer (i.e., the three-dimensional sensor control device 1) to function as a data acquirer 21, a data organizer 22, a first coordinate-converter 23, a farthest point locator 24, a second coordinate-converter 25, and an environment map developer 26.

The data acquirer 21 acquires a cloud of data points and identifies their locations in the orthogonal coordinate system (x, y, z). The cloud of data points includes sets of data points that represent a plurality of photograph frames photographed by the three-dimensional sensor 2 having a fixed photographing range. The data organizer 22 organizes, into a single array, the cloud of data points expressed by their orthogonal coordinates, which represent the plurality of the photograph frames acquired by the data acquirer 21. The first coordinate-converter 23 converts the cloud of data points expressed by their orthogonal coordinates into a cloud of data points expressed by polar coordinates using a first formula for conversion from orthogonal coordinates to polar coordinates. The farthest point locator 24 searches each of sub-regions included in the photographing range and locates the data point in the polar coordinate system for each sub-region that is farthest in distance from the three-dimensional sensor 2 (farthest data point). The second coordinate-converter 25 converts the farthest data points in the polar coordinate system into farthest data points in the orthogonal coordinate system using a second formula for conversion from the polar coordinates to the orthogonal coordinates. The environment map developer 26 outputs environment map data within the photographing range, based on a collection of farthest data points concerted back in the orthogonal coordinate system by the second coordinate converter 25. Each function will be described in detail with reference to FIG. 4.

In addition to the functions shown in FIG. 2, the three-dimensional sensor control device 1 also includes functions such as a function of controlling operations of the three-dimensional sensor 2 and a function of performing predetermined processes utilizing the environment map data. However, detailed descriptions of such functions are omitted.

Figure 3:
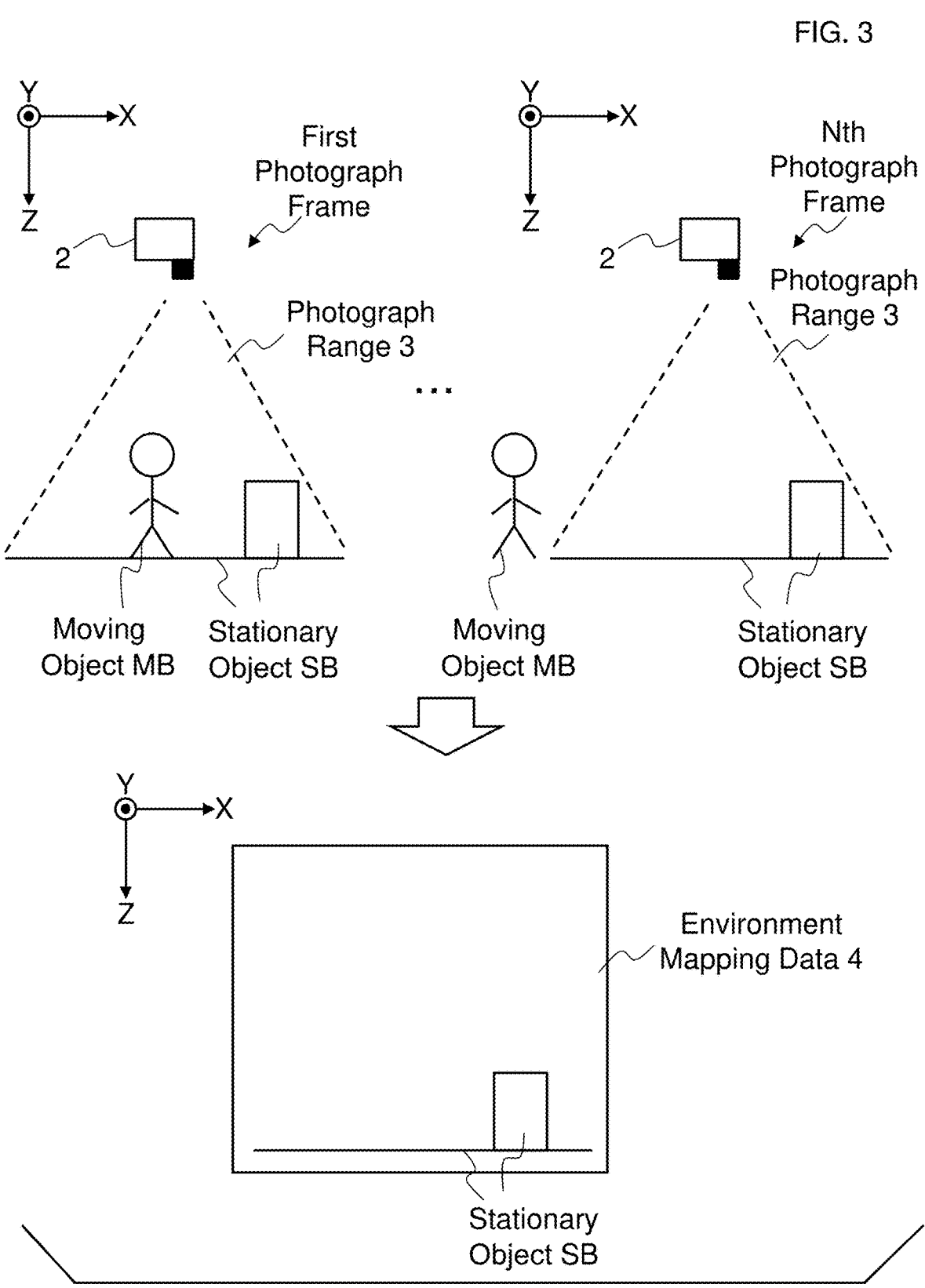
FIG. 3 is a schematic view illustrating environment mapping data generated by an environment map generation program of the present invention.

FIG. 3 is a schematic view illustrating environment map data generated by the environment map generation program 10 of the present invention. Although FIG. 3 shows a schematic view in a two-dimensional X-Z plain, the three-dimensional sensor control device 1 recognizes a three-dimensional X-Y-Z space. In an example shown in FIG. 3, the number of photograph frames photographed by the three-dimensional sensor 2 is N, which represents an N number of frames from the first photograph frame to the Nth photograph frame in a chronological order. A photographing range 3 of the first photographing frame includes a moving object MB such as a human and a stationary object SB such as a device, a table, and a floor. The moving object MB moves out before taking the Nth photograph frame and thus the photographing range 3 of the Nth photograph frame includes only the stationary object SB.

Although the three-dimensional sensor 2 takes photographs from above in the vertical direction facing downward in FIG. 3, a photographing direction of the three-dimensional sensor 2 is not limited thereto and may be upward from bottom in the vertical direction, horizontal, or any other direction. Also, the three-dimensional sensor 2 may be installed at a ceiling, a floor, a wall, or a tripod. The three-dimensional sensor 2 may also be installed on a vehicle, a robot, a drone, a computer, and others that utilize environment map data 4.

An environment map generation process that is to be realized by executing the environment map generation program 10 of the present invention generates the environment map data 4 accurately and speedily even in an environment that includes the moving object MB. More specifically, the environment map generation process of the present embodiment generates the environment map data 4 at a high speed that only includes the stationary object SB as a landmark, while disregarding the presence of the moving object MB even in an environment where both the moving object MB and the stationary object SB are present.

FIG. 4 is a flow chart showing an exemplary flow of the environment map generation process realized by executing the environment map generation program shown in FIG. 2. As shown in FIG. 4, the data acquirer 21 of the three-dimensional sensor control device 1 compares a pre-designated count N with a photograph count i of the three-dimensional sensor 2 in the environment map generation process, and the process described below are repeated while the photograph count i is less than or equal to the pre-designated count N (step S1).

During the repeated processes, the data acquirer 21 acquires a cloud of data points in the orthogonal coordinate system from the three-dimensional sensor 2 via the input/output interface 14 (step S2), counts a photograph count i, i.e., substituting i for (i+1) (step S3), and makes a judgment in the step S1. Through repeating the process, the data acquirer 21 acquires the cloud of data points in the orthogonal coordinate system for each of the N number of photographing frames.

Next, the data organizer 22 of the three-dimensional sensor control device 1 organizes, into a single array, the cloud of data points expressed by orthogonal coordinates obtained from each of the N number of photograph frames by the data acquirer 21 (step S4). For example, if the number of the data points in the orthogonal coordinate system in a single photographing frame is D, the data organizer 22 organizes the cloud of data points and prepares an array of N×D data points each expressed by orthogonal coordinates, wherein each data point is expressed by a single set of orthogonal coordinates (x, y, z). Since the orthogonal coordinates of each data point are represented by the three-dimensional orthogonal coordinates (x, y, z), the array organized in the step S4 includes an N×D sets of orthogonal coordinates (x, y, z).

Next, the first coordinate-converter 23 of the three-dimensional sensor control device 1 converts each cloud point in the orthogonal coordinate system (x, y, z), which represent a set of coordinates in the array organized in the step S4, into a cloud point in polar coordinate system, using the first formula for conversion from the orthogonal coordinates to the polar coordinates (step S5).

Figure 5:
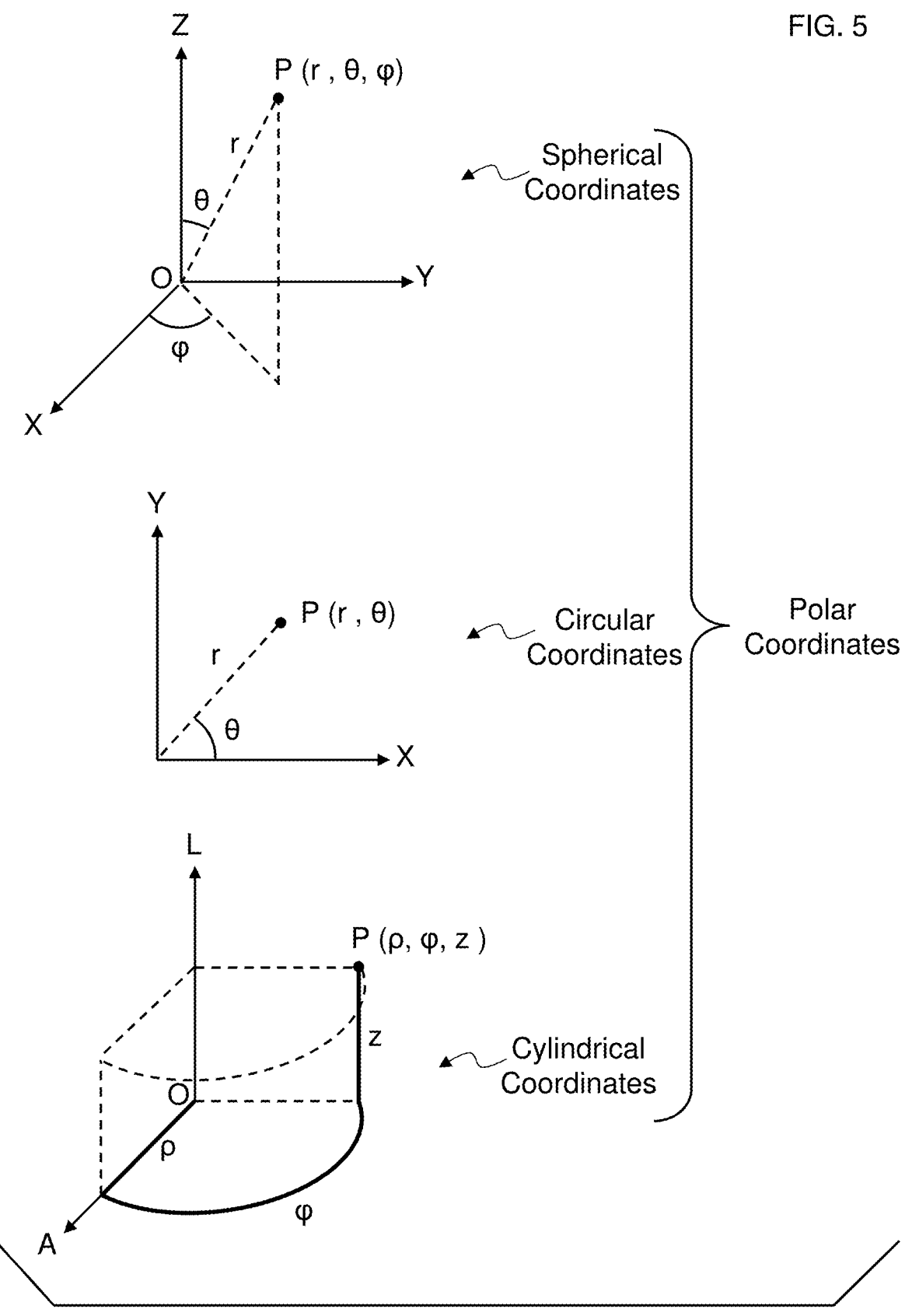
FIG. 5 is a schematic view illustrating polar coordinates.

FIG. 5 is a schematic view illustrating examples of polar coordinate system. The polar coordinate system may be a spherical coordinate system in a three-dimensional space, circular coordinates in a two-dimensional space, or cylindrical coordinates in which Z axis is added to the circular coordinates. As shown in FIG. 5, the spherical coordinate system (r, θ, φ) includes coordinates of a vector radius r, a polar angle (or a zenith angle) θ, and an azimuth angle φ. The circular coordinate system (r, θ) includes coordinates of the vector radius r and a deflection angle θ. The cylindrical coordinate system (ρ, φ, z) includes coordinates of an axial distance (or radial distance) ρ, an azimuth angle φ, and an axial coordinate (or height) z. The descriptions of the present invention will be made using the spherical coordinate system as a representative polar coordinate system.

A possible range of each of the coordinates of the spherical coordinate system (r, θ, φ) depends on an angle range of view or a distance range of detection by the three-dimensional sensor 2. The formulas for conversion from the three-dimensional orthogonal coordinates (x, y, z) to the spherical coordinates (r, θ, φ) are shown in Formula (1) to Formula (3).

(Equation 1)

$$x = r\sin\theta\cos\phi \qquad (1)$$

$$y = r\sin\theta\sin\phi \qquad (2)$$

$$z = r\cos\theta \qquad (3)$$

Returning to FIG. 4, the first coordinate-converter 23 of the three-dimensional sensor control device 1 then, based on the values of the cloud of data points found in a sub-region of the photographing range 3 and captured with the polar angle θ and the azimuth angle φ of the polar coordinates, provides each data point in the array organized in the step S4 with identification information identifying the sub-region of the photographing range 3 (step S6).

Figure 6:
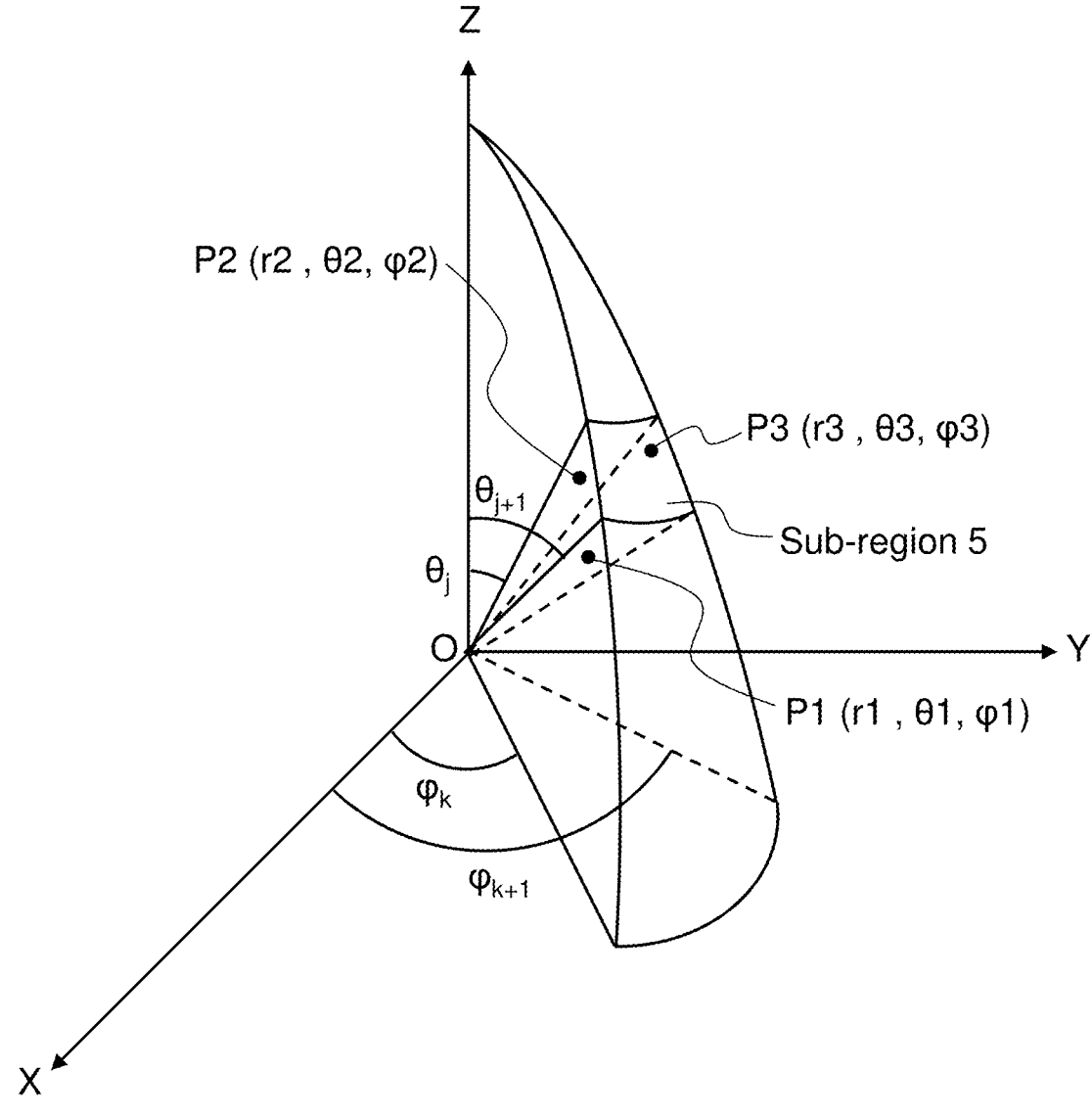
FIG. 6 is a schematic view illustrating a sub-region and a process by a furthest point searching part.

FIG. 6 is a schematic view illustrating a sub-region to explain a process performed by the farthest point locator. A sub-region 5 is a section identified by the polar angle θ and the azimuth angle φ. In more detail, as shown in FIG. 6, the sub-region 5 is a three-dimensional region having a quadrangular pyramid shape defined by a polar angular interval $(\theta_{j+1}-\theta_j)$ (where $\theta_{j+1}>\theta_j$) of the polar angle θ and an azimuth angular interval $(\phi_{j+1}-\phi_j)$ (where $\phi_{j+1}>\phi_j$) of the azimuth angle φ. For example, if the polar angular interval θ and the azimuth angular interval φ are both one (1) degree, the sub-region 5 is sectioned into a first region (0°<θ≤1° and 0°<φ≤1°), a second region (0°<θ≤1° and 1°<φ≤2°), and so on. The identification information may be any information that can uniquely identify each of the sections in the sub-regions and may be serial numbers or combinations of two numbers such as (1, 1), (1, 2), and so on.

Since the array organized in the step S4 includes the cloud of data points in photograph frames photographed at different times within the same photographing range 3, there may be sets of coordinates having the same polar angle θ and the same azimuth angle φ. That is, the same identification information may be given to a plurality of sets of coordinates in the array. Furthermore, the plurality of sets of coordinates in the array to which the same identification information is given may include sets of coordinates with the same vector radius r, or with different vector radii r.

Returning to FIG. 4, the farthest point locator 24 of the three-dimensional sensor control device 1 reviews the value of the vector radius r of each set of coordinates identified by respective identification information (i.e., with respect to a respective sub-region 5) given in the step S6, and searches for a set of coordinates having the largest vector radius r (the farthest data point) in the respective sub-regions 5 (step S7). It is defined in the description associated with FIG. 2 that the farthest data point data is expressed by a set of polar coordinates representing the data point located at the farthest distance from the three-dimensional sensor 2. Thus, if the position of the three-dimensional sensor 2 is taken as the origin of the polar coordinate system, a set of polar coordinates including the largest vector radius r represents the polar coordinates of the farthest data point.

In an example shown in FIG. 6, the sub-region 5 defined by $\theta_j < \theta \leq \theta_{j+1}$ and $\varphi_j < \varphi \geq \varphi_{j+1}$ includes three data points having polar coordinates of P1 (r1, θ1, φ1), P2 (r2, θ2, φ2), and P3 (r3, θ3, φ3). For example, if r1<r2<r3, the farthest point locator 24 takes P3, which has the largest vector radius as the farthest data point.

One photograph frame, if captured to show that no moving object MB is present at any locations in the photographing range 3, can assure that the farthest data point located by the farthest point locator 24 does not include the position information of the moving object MB. This is because all vector radii r included in the cloud of data points in the polar coordinate system that represent the positions of the moving object MB, such as a human, are supposed to be smaller than any vector radii r included in the cloud of data points in the polar coordinates that represent the positions of the stationary objects SB such as a floor. Thus, by using only the farthest data point, the environment map data 4 in which no moving object MB is present can be generated.

Next, the data organizer 22 of the three-dimensional sensor control device 1 organizes sets of the farthest data points located by the farthest point locator 24 into a single array (step S8). The single array organized in the step S8 includes sets of spherical coordinates in which the number of the organized sets of the farthest points is unknown (approximately D).

Next, using the second formula for conversion from the polar coordinates to the orthogonal coordinates, the second coordinate-converter 25 of the three-dimensional sensor control device 1 converts the sets of farthest data points in the polar coordinate system, which represent the sets of farthest points organized in the single array in the step S8 and prepares sets of data points arranged in the orthogonal coordinate system, using the second formula for conversion from the polar coordinates to the orthogonal coordinates (step S9). The formulas for conversion from the spherical coordinates (r, θ, φ) to the three-dimensional orthogonal coordinates (x, y, z) are shown in Formula (4) to Formula (6).

(Equation 2)

$$r = \sqrt{x^2 + y^2 + z^2} \tag{4}$$

$$\theta = \arccos\left(z/\sqrt{x^2 + y^2 + z^2}\right) \tag{5}$$

$$\phi = \operatorname{sgn}(y)\arccos\left(x/\sqrt{x^2 + y^2}\right) \tag{6}$$

$$\operatorname{sgn}(y) = \begin{cases} 1 & (y \geq 0) \\ -1 & (y < 0) \end{cases}$$

Next, the environment map developer 26 of the three-dimensional sensor control device 1 generates the environment map data 4 using only the sets of the orthogonal coordinates converted from the farthest data points in the step S9. Then, the environment map developer 26 outputs the environment map data 4 to an output device such as a display or to an external computer via the input/output interface 14 (step S10). The outputted environment map data 4 includes no position information of any moving object MB but includes the position information of only the stationary object SB.

As above, the three-dimensional sensor control device 1 converts the orthogonal coordinates of the cloud of data points into the polar coordinates of a cloud of data points and searches each of sub-regions 5 for the farthest data point in each sub-region 5, which is farthest in distance from the three-dimensional sensor 2. This makes it possible to generate the environment map data 4 that only includes the stationary object SB as a landmark, while excluding any moving object MB even in an environment where both the moving object MB and the stationary object SB are present.

The background difference method can eliminate the moving object MB from an ordinary still images by using a background difference method. However, clouds of data points acquired by the three-dimensional sensor 2 may result with variations even if they are acquired in the same environment, and thus the background difference method is not useful to isolate out a difference. So, the three-dimensional sensor control device 1 distinguishes the moving object MB from the stationary object SB, based on distance information provided by the polar coordinates. With the use of the method according to the present invention, matching between clouds of data points (i.e., cloud matching) does not need to be performed, and high-speed processing can be achieved. Furthermore, it can be avoided to recognize the moving object MB as a landmark and generate incorrect environment map data 4.

An exemplary polar coordinate system used in the present embodiment is the spherical coordinate system in which coordinates are expressed with a vector radius r, a polar angle θ, and an azimuth angle φ. Also, the three-dimensional sensor control device 1 searches each sub-region 5 sectioned by the polar angle θ and the azimuth angle φ and locates a set of polar coordinates that represents a data point with the largest vector radius r as the farthest data point. A detectable range for a distance, a detectable range for a vertical angle of view, and a detectable range for a horizontal angle of view of the three-dimensional sensor 2 are determined by possible search ranges of the vector radius r, polar angle θ, and azimuth angle φ of the spherical coordinates, respectively. That is, since the possible search range of each coordinate of the spherical coordinates (r, θ, φ) can be predicted from the operational range of the three-dimensional sensor 2, it is reasonable to use the spherical coordinates. Furthermore, the use of spherical coordinates provides an easily perceivable reason why the moving object MB can be eliminated by the present invention.

Also, the three-dimensional sensor control device 1 provides the identification information identifying a sub-region 5 based on values of the polar angle θ and the azimuth angle φ of the cloud of data points, and searches each identification information for the farthest point data. This allows the search process for the farthest point data to be executed at a high speed.

Although the orthogonal coordinates of a cloud of data points are represented by the three-dimensional orthogonal coordinates (x, y, z) in the above description, the orthogonal coordinates of the cloud of data points may be represented by two-dimensional orthogonal coordinates (x, y). In such a case, the three-dimensional sensor control device 1 takes the circular coordinates (r, θ) shown in FIG. 5 as the polar coordinates and uses a known formula for conversion from the two-dimensional orthogonal coordinates to the circular coordinates and a known formula for conversion from the circular coordinates to the two-dimensional orthogonal coordinates. Then, the three-dimensional sensor control device 1 searches each triangular sub-region 5, which is sectioned by the deflection angle θ, for the polar coordinates point cloud data having the largest value of the vector radius r as the farthest point data. For example, when the environment map data 4 is generated by installing the three-dimensional sensor 2 on a robot cleaner that has a small vertical dimension and only moves in horizontal directions, two-dimensional information may be sufficient.

Also, the polar coordinate system may be the cylindrical coordinate system (p, q, z) shown in FIG. 5. In such a case, the three-dimensional sensor control device 1 uses a known formula for conversion from the three-dimensional orthogonal coordinates to the cylindrical coordinates and a known formula for conversion from the cylindrical coordinates to the three-dimensional orthogonal coordinates. Then, the three-dimensional sensor control device 1 searches each triangular sub-region 5, which is sectioned by the axial coordinate z and the azimuth angle φ, for a set of polar coordinates having the largest axial distance p as the farthest point data. For example, it may be convenient to use the cylindrical coordinates when the environment map data 4 is generated by installing the three-dimensional sensor 2 on a cylindrical coordinate robot including at least one joint for rotary motion and one joint for linear motion.

Although the preferred embodiments for the environment map generation program and the three-dimensional sensor control device or the like according to the present invention have been described above referring to the attached drawings, the technical scope of the present invention is not limited to such examples. It is obvious that persons skilled in the art can think out various examples of changes or modifications within the scope of the technical idea disclosed in the claims, and it will be understood that they naturally belong to the technical scope of the present invention.

What is claimed is:

1. A non-transitory computer-readable storage medium storing a computer program for causing at least one processor to implement:

acquiring orthogonal coordinates of data points found in a plurality of photograph frames photographed by at least one three-dimensional sensor with a photographing range;

converting the orthogonal coordinates of the data points into polar coordinates using a first formula for conversion from orthogonal coordinates to polar coordinates;

searching sub-regions of the photographing range to locate in each sub-region a set of polar coordinates representing a farthest data point that is located farthest in distance from the three-dimensional sensor, wherein the sub-regions are defined in the photographing range to have a generally quadrangular pyramid shape, and further wherein the polar coordinates are expressed by a spherical coordinate system including coordinates of a vector radius, a polar angle, and an azimuth angle, wherein the sub-region is defined by a polar angle interval and an azimuth angle interval, and searching each sub-region to locate the farthest data point comprises searching each sub-region to locate a set of polar coordinates having a largest vector radius;

converting the polar coordinates of a collection of the farthest data points data back into orthogonal coordinates using a second formula for conversion from the polar coordinates to the orthogonal coordinates; and outputting environment map data of the photographing range developed based on the orthogonal coordinates of the collection of the farthest data points.

2. The non-transitory computer-readable storage medium storing the computer program according to claim 1 for causing the at least one processor to further implement:

examining the polar angles and the azimuth angles expressed in the polar coordinates of the data points and providing identification information to sets of data points found in the sub-region, wherein the identification information identifies the sub-region; and using the identification information to identify the sets of data points found in the sub-region and searching the sub-region to locate the farthest data point in the sub-region.

3. A three-dimensional sensor control device comprising:

at least one memory that stores a computer program; and at least one processor that executes a computer program to implement:

acquiring orthogonal coordinates of data points found in a plurality of photograph frames photographed by at least one three-dimensional sensor with a photographing range;

converting the orthogonal coordinates of the data points into polar coordinates using a first formula for conversion from orthogonal coordinates to polar coordinates;

searching sub-regions of the photographing range to locate in each sub-region a set of polar coordinates representing a farthest data point that is located farthest in distance from the three-dimensional sensor, wherein the sub-regions are defined in the photographing range to have a generally quadrangular pyramid shape, and further wherein the polar coordinates are expressed by a spherical coordinate system including coordinates of a vector radius, a polar angle, and an azimuth angle, wherein the sub-region is defined by a polar angle interval and an azimuth angle interval, and searching each sub-region to locate the farthest data point comprises searching each sub-region to locate a set of polar coordinates having a largest vector radius;

converting the polar coordinates of a collection of the farthest data points into orthogonal coordinates using a second formula for conversion from the polar coordinates to the orthogonal coordinates; and outputting environment map data of the photographing range developed based on the orthogonal coordinates of the collection of the farthest data points.

4. The three-dimensional sensor control device according to claim 3, wherein the at least one processor executes the computer program to further implement:

examining the polar angles and the azimuth angles expressed in the polar coordinates of the data points and providing identification information to sets of data points found in the sub-region, wherein the identification information identifies the sub-region; and using the identification information to identify the sets of data points found in the sub-region.

* * * * *